United States Patent
Miller et al.

(10) Patent No.: US 9,982,435 B2
(45) Date of Patent: May 29, 2018

(54) GLAZING PANEL ROOFING SYSTEM

(71) Applicants: David Miller, Plymouth, MI (US); Frank Kosciolek, Redford, MI (US)

(72) Inventors: David Miller, Plymouth, MI (US); Frank Kosciolek, Redford, MI (US)

( * ) Notice: Subject to any disclaimer, the term of this patent is extended or adjusted under 35 U.S.C. 154(b) by 0 days. days.

(21) Appl. No.: 15/153,521

(22) Filed: May 12, 2016

(65) Prior Publication Data

US 2016/0333585 A1  Nov. 17, 2016

Related U.S. Application Data

(60) Provisional application No. 62/160,981, filed on May 13, 2015.

(51) Int. Cl.
*E04B 7/18* (2006.01)
*E04D 3/08* (2006.01)
*F16B 25/10* (2006.01)
*F16B 5/06* (2006.01)

(52) U.S. Cl.
CPC ........ *E04D 3/08* (2013.01); *E04D 2003/0818* (2013.01); *E04D 2003/0856* (2013.01); *F16B 25/10* (2013.01); *F16B 2005/0678* (2013.01)

(58) Field of Classification Search
CPC ... E04D 13/0315; E04D 13/0305; E04D 3/08; E04D 2003/0818; E04D 2003/0856; F16B 2005/0678; F16B 25/10
USPC ........................................................ 52/200
See application file for complete search history.

(56) References Cited

U.S. PATENT DOCUMENTS

| | | | |
|---|---|---|---|
| 745,310 A * | 11/1903 | Degenhardt | |
| 3,844,087 A * | 10/1974 | Schultz | E04D 3/08 52/200 |
| 4,100,703 A | 7/1978 | Sickier | |
| 4,439,969 A | 4/1984 | Bartlett | |
| 4,571,899 A | 2/1986 | Minter | |
| 4,680,905 A * | 7/1987 | Rockar | E04D 3/08 52/200 |
| 5,155,952 A | 10/1992 | Herwigh et al. | |
| 5,356,675 A * | 10/1994 | Unger | E04B 1/0046 428/33 |
| 6,105,317 A | 8/2000 | Tomiuchi et al. | |
| 6,122,886 A * | 9/2000 | Richardson | E04D 3/06 52/200 |
| 8,578,671 B2 | 11/2013 | Labrecque et al. | |
| 2006/0174579 A1 | 8/2006 | Matson | |

\* cited by examiner

*Primary Examiner* — Patrick J Maestri
(74) *Attorney, Agent, or Firm* — Vincent Re PLLC

(57) ABSTRACT

A glazing panel roofing system includes a glazing panel and glazing panel brackets configured to clamp upon one of the side edge surfaces of the glazing panel. The glazing panel includes two flat face surfaces and two side edge surfaces. The glazing panel brackets are configured to clamp upon one of the side edge surfaces of the glazing panel. Each glazing panel bracket includes a base clamping feature including a base gripping feature surface configured to abut a first surface of the flat face surfaces, a top clamping feature including a top gripping feature surface configured to abut a second surface of the flat face surfaces, and a threaded fastener securing the top clamping feature to the base clamping feature, wherein torque applied to the threaded fastener changes a clamping force applied between the top clamping feature and the base clamping feature upon the glazing panel.

15 Claims, 7 Drawing Sheets

GLAZING PANEL ROOFING SYSTEM

CROSS REFERENCE TO RELATED APPLICATIONS

This disclosure claims the benefit of U.S. Provisional Application No. 62/160,981 filed on May 13, 2015 which is hereby incorporated by reference.

TECHNICAL FIELD

This disclosure is related to an object for use in roofing. In particular, the disclosure is related to a system for securely bracketing glazing panels.

BACKGROUND

The statements in this section merely provide background information related to the present disclosure. Accordingly, such statements are not intended to constitute an admission of prior art.

Glazing panels are known in the art. They can be suspended over an area to provide roofing. Glazing panels can be transparent or translucent, allowing light to pass through the roofing into the area being covered.

Systems to secure glazing panels are known to grip all four sides of a rectangular glazing panel. Like a window pane held on four sides by window framing, the glazing panel cannot move in any direction due to the gripping features on each side of the panel abutting the panel.

SUMMARY

A glazing panel roofing system includes at least one glazing panel and glazing panel brackets each configured to clamp upon one of the side edge surfaces of the glazing panel. The glazing panel includes two flat face surfaces and two side edge surfaces. The glazing panel brackets are each configured to clamp upon one of the side edge surfaces of the glazing panel. Each glazing panel bracket includes a base clamping feature secured to a roof support structure and including a base gripping feature surface configured to abut a first surface of the flat face surfaces, a top clamping feature including a top gripping feature surface configured to abut a second surface of the flat face surfaces, and a threaded fastener securing the top clamping feature to the base clamping feature, wherein torque applied to the threaded fastener changes a clamping force applied between the top clamping feature and the base clamping feature upon the glazing panel.

BRIEF DESCRIPTION OF THE DRAWINGS

One or more embodiments will now be described, by way of example, with reference to the accompanying drawings, in which.

DETAILED DESCRIPTION

A system is disclosed for holding a glazing panel between two panel bracketing units for use in a roofing system. Glazing panels are typically made of polymerized material, although they can include glass panels. The polymerized materials can be treated to prevent yellowing or darkening when exposed to sunlight or the elements. Glazing panels for use with the present roofing system can be quite long, with some embodiments including 40 foot long panels or more.

A panel bracketing unit is disclosed which clamps a long edge of the glazing panel and which secures to a structural member below the panel bracketing unit. By clamping the panel along the long edge, significant structural strength can be achieved by the disclosed system, including significant resistance to wind load and snow load.

Figure 1:
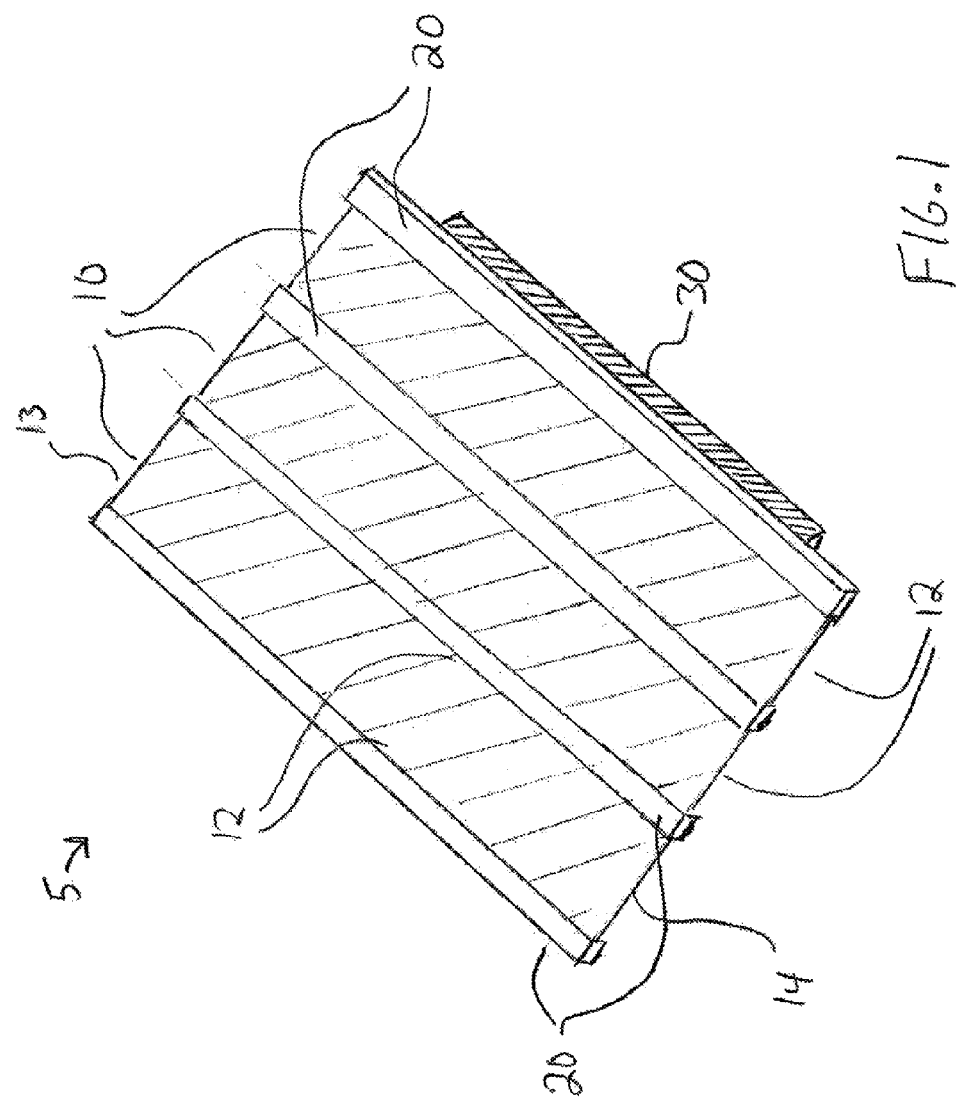
FIG. 1 illustrates an exemplary embodiment of a glazing panel roofing system, including a plurality of glazing panels held in place between glazing panel brackets securely holding the panels along two opposite edges of the glazing panels, in accordance with the present disclosure.

FIG. 1 illustrates an exemplary embodiment of a glazing panel roofing system, including a plurality of glazing panels held in place between glazing panel brackets securely holding the panels along two opposite edges of the glazing panels. Glazing panel roofing system 5 is illustrated including glazing panels 10 each including an exemplary rectangular shape, with two long sides 12 and two short sides, short side 13 at a top of the panel and short side 14 at a bottom of the panel. Along each of the long sides 12, glazing panel brackets 20 securely clamp to the glazing panels 10. Glazing panel brackets 20 are attached to roof support structure 30.

Roof support structure 30 can be any underlying framework, series of members, or set of brackets. Roof support structure 30 can include members running parallel or perpendicular to the glazing panel brackets 20.

Short side 14 of glazing panel 10 is exposed, with no bracket securing that edge of panel 10. As a result, rain falling upon glazing panel 10 can run directly off of panel 10, and no raised edge on glazing panel 10 will cause water to pool along side 14. As a result, virtually any non-horizontal orientation of panel 10 can be used in a roofing situation where panel 10 will be exposed to rain.

Glazing panel 10 is illustrated including two flat rectangular face surfaces, two thin, long side surfaces, and two thin, short side surfaces. It will be appreciated that trapezoidal, parallelogram, or other quadrahedral shapes or triangular shapes can be used with panel 10, and although panel 10 is described as rectangular herein, the disclosure is not intended to be limited to the particular specific shape of a specific glazing panel.

Figure 2:
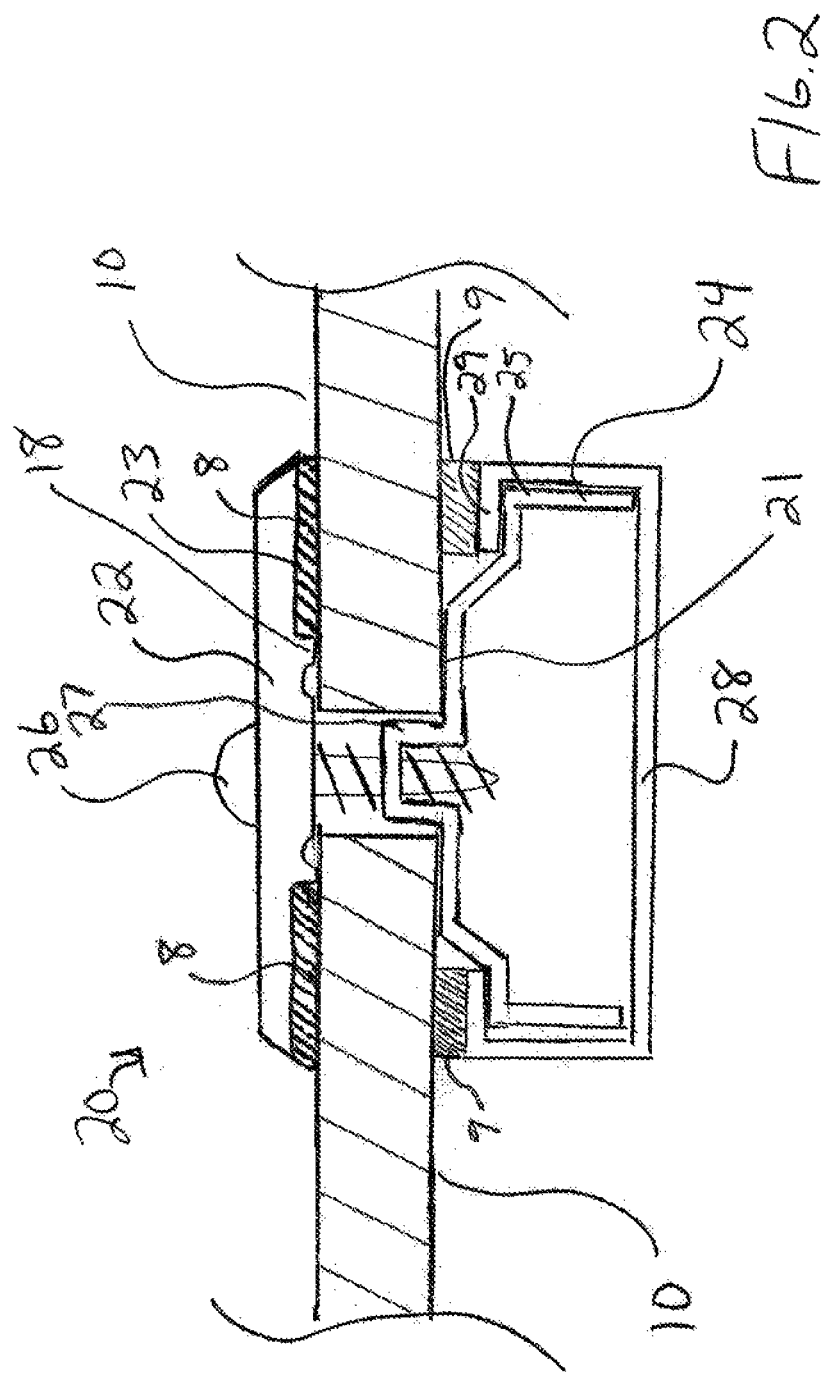
FIG. 2 illustrates glazing panels held in place between clamping features of a glazing panel bracket, in accordance with the present disclosure.

FIG. 2 illustrates glazing panels held in place between clamping features of a glazing panel bracket. Glazing panel bracket 20 is illustrated including a top clamping feature 22 and a base clamping feature 24. Top clamping feature 22 and base clamping feature 24 are secured to each other by threaded fastener 26. By applying torque to fastener 26, a clamping force between top clamping feature 22 and base clamping feature 24 can be changed or increased. Top clamping feature 22 and base clamping feature 24 apply clamping force to glazing panels 10 inserted between the clamping features.

In the embodiment of FIG. 2, top clamping feature 22 and base clamping feature 24 do not touch each other, and a gap is present between the clamping features. If top clamping feature 22 and base clamping feature 24 do contact each other, a maximum clamping force to be applied to the glazing panels can be governed by the clamping features coming into hard contact. by configuring the clamping features with a gap therebetween, a clamping force can be modulated as needed based upon changing torque upon fastener 26. Further, the gap between the clamping features permits different thicknesses of glazing panels to be used with the same glazing panel brackets. In one embodiment, fasteners 26 with different lengths can be selected to match/suit the glazing panel thickness.

Base clamping feature 24 is illustrated slid within base channel support 28. Base channel support 28 includes channel retaining features 29 which wrap around base clamping feature 24 to retain feature 24 within a channel internal to base channel support 28. Such a configuration where feature 24 can be slid within base channel support 28 can be advantageous to easy construction upon a roofing surface. Base clamping feature 24 includes vertical support sections 25 securing feature 24 within the channel of base channel support 28.

Features of the glazing panel brackets 20 can be constructed of any of a number of materials. In one exemplary construction, top clamping feature 22, base clamping feature 24, and base channel support 28 can each be constructed of extruded aluminum. In other examples, the components of the glazing panel brackets can be constructed of bent or molded metal. In other examples, the components of the glazing panel brackets can be constructed of durable polymers.

Gripping features of glazing panel bracket 20 gripping to glazing panels 10 can be configured in a number of ways. Gripping features can be formed with flat surfaces of the clamping features. Gripping features can include grooves or tooth sections configured to dig into the glazing panels. In the exemplary embodiment of FIG. 2, base clamping feature 24 includes flat section 21, and top clamping feature 22 includes raised portion 18, where section 21 and feature 22 each directly contact glazing panels 10 and applying clamping force between the clamping features. Additionally, rubberized pads 8 and 9 are adhered to top clamping 22 and base channel support 28, respectively, providing padded support of the panel, such that if the panels flex under load, the pads enable flexing of the panel without damaging the panels.

Fastener 26 is illustrated inserted through a hole in top clamping feature 22 and screwed into raised boss feature 27 of base clamping feature 24

Figure 3:
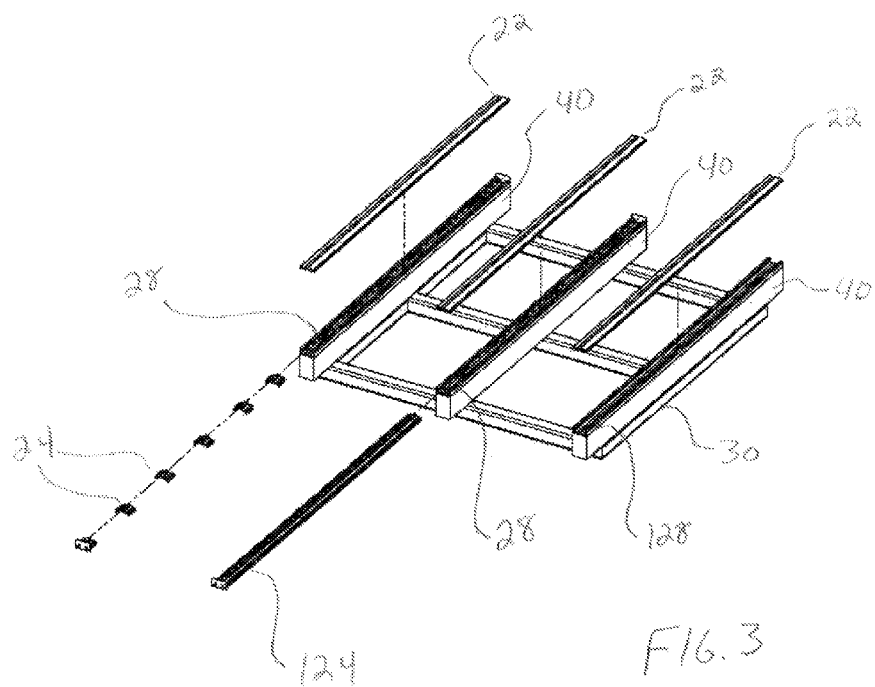
FIG. 3 illustrates three exemplary glazing panel bracket configurations that can be used to securely hold glazing panels, in accordance with the present disclosure.

FIG. 3 illustrates three exemplary glazing panel bracket configurations that can be used to securely hold glazing panels. Glazing panel brackets 20 can include a number of different embodiments. A first base channel support 28 is illustrated, with a plurality of individual base clamping features 24 each configured to be slid within a base channel support, with each of the base clamping features configured to accept one fastener. A second base channel support 28 is illustrated, with an elongated single base clamping feature 124 configured to accept a plurality of fasteners. A base clamping feature 128 is illustrated configured to be used without a base channel support.

Base channel supports or base clamping features can be secured directly to a roof support structure 30. Roof support structure 30 can include any configuration, for example, including a pattern of square metal tubing, parallel studs, or any other configuration known in the art. FIG. 3 illustrates optional spacer units lifting the glazing panel brackets off of roof support structure 30. Top clamping features 22 are illustrated configured to be secured to each of base clamping features 24, base clamping feature 124, and base clamping feature 128. Base clamping features 24, base clamping feature 124, and base clamping feature 128 are illustrated in a single glazing panel roofing system for purposes of illustrating exemplary alternative constructions. It will be appreciated that any given roofing system can include any one or more than one of base clamping features 24, base clamping feature 124, and base clamping feature 128.

Figure 4:
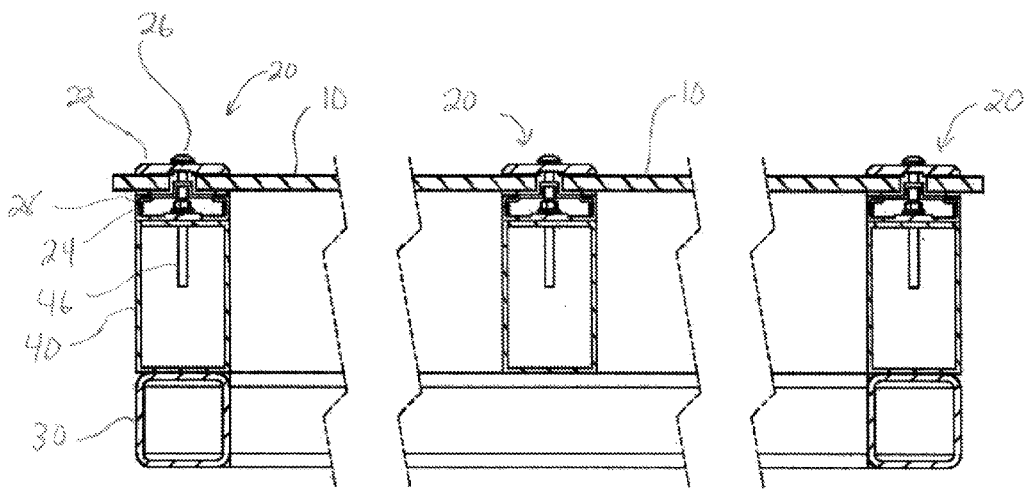
FIG. 4 illustrates in cross-section an exemplary embodiment of a glazing panel roofing system, including optional spacer units raising the roofing system from a roof support structure, in accordance with the present disclosure.

FIG. 4 illustrates in cross-section an exemplary embodiment of a glazing panel roofing system, including optional spacer units raising the roofing system from a roof support structure. Glazing panels 10 are illustrated clamped between glazing panel brackets 20. Glazing panel brackets 20 are illustrated attached to spacer units 40 with fasteners 46. Spacer units 40 are illustrated attached to roof support structure 30. Glazing panel brackets 20 include top clamping feature 22, base clamping feature 24 contained within base channel support 28. Fastener 26 is illustrated securely fastening top bracket feature 22 to base clamping feature 24 and providing clamping force upon glazing panel 10. Spacer units 40 are illustrated as rectangular tube sections. Spacer units 40 can be any shape or material that can be used to support a roof structure.

Figure 5:
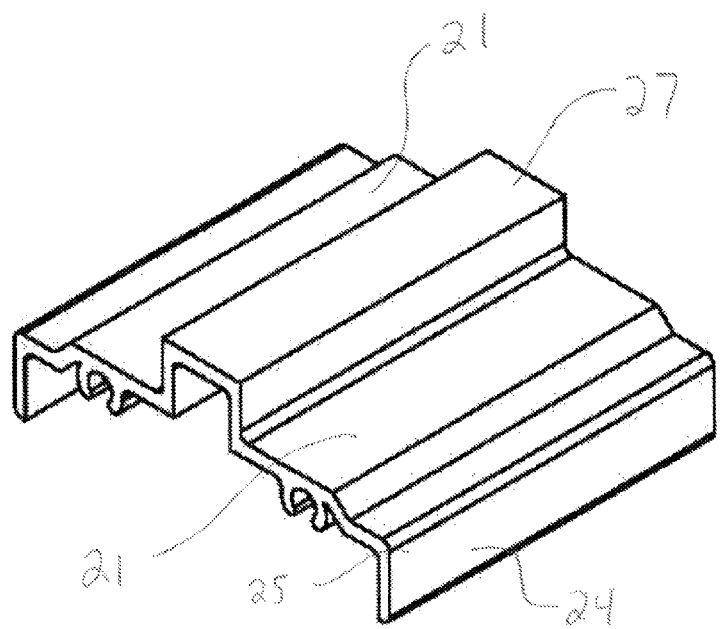
FIG. 5 illustrates an exemplary base clamping feature configured to be slid within a channel base support, in accordance with the present disclosure.

FIG. 5 illustrates an exemplary base clamping feature configured to be slid within a channel base support. Base clamping feature 24 is illustrated in detail. Base clamping feature 24 includes vertical support sections 25 configured to fit within a channel of a matching base channel support. Flat portions 21 are provided for abutting a glazing panel and applying a clamping force thereto as a fastener is secured to raised boss portion 27. Self-tapping screws can be used to create holes in raised boss portion 27. Holes can be drilled into raised boss portion to provide a starting point for self-tapping screws. In another embodiment, holes of a particular dimension can be created in raised boss portion 27 configured to accept a machine screw. In another embodiment, a secondary screw boss or anchor device can be added to raised boss portion 27 to receive a threaded fastener. Raised boss portion 27, by providing right angles on a top of base clamping feature 24, increases structural rigidity of the clamping feature. In another embodiment, the clamping feature can include simple flat top in place of raised boss portion 27.

Figure 6:
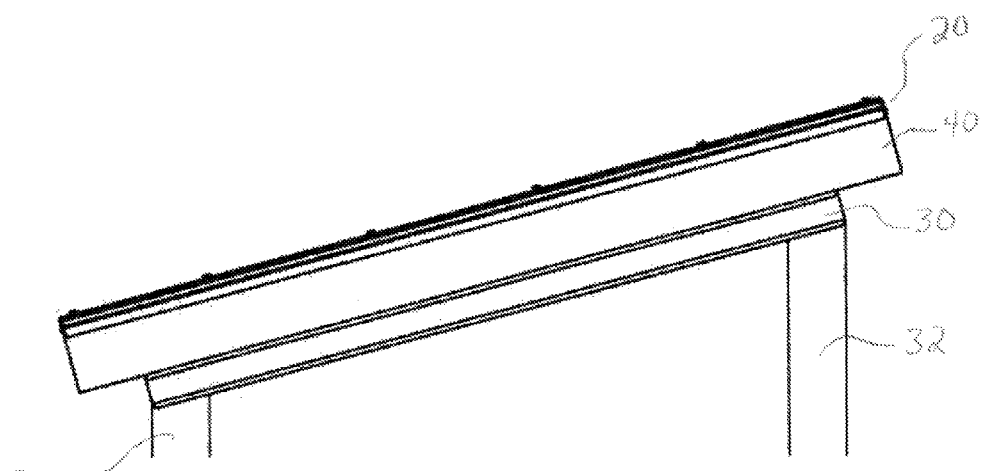
FIG. 6 illustrates the glazing panel roofing system of FIG. 4 in side profile, in accordance with the present disclosure.

FIG. 6 illustrates the glazing panel roofing system of FIG. 4 in side profile. Glazing panel bracket 20 is illustrated fastened to a top of spacer unit 40, with spacer unit 40 attached to roof support structure 30. Roof support structure 30 is supported by exemplary structural supports 32 which can extend to a foundation or a floor surface.

Figure 7:
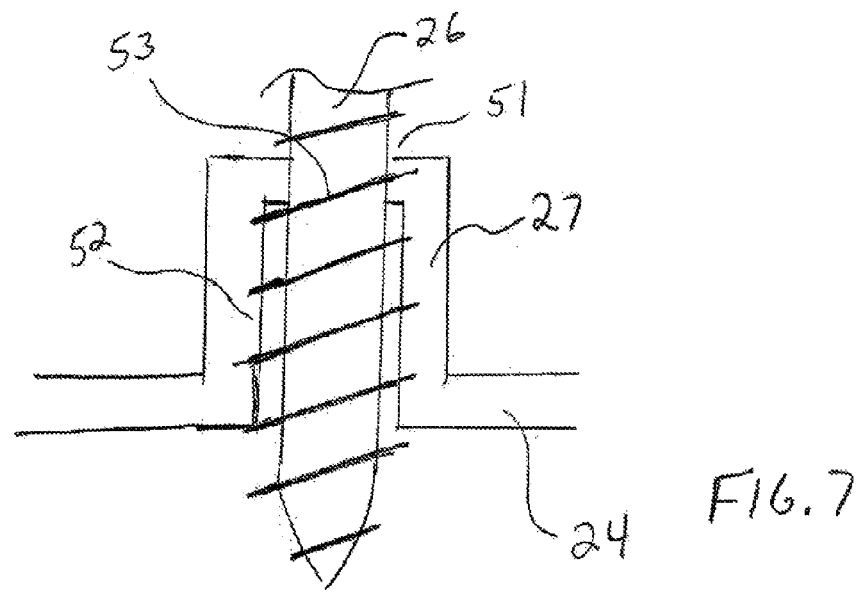
FIG. 7 illustrates in cross-section an exemplary self-tapping screw being used to fasten to a base clamping feature, with the threads of the screw engaging to a raised boss portion of the base clamping feature, in accordance with the present disclosure.

FIG. 7 illustrates in cross-section an exemplary self-tapping screw being used to fasten to a base clamping feature, with the threads of the screw engaging to a raised boss portion of the base clamping feature. Self-tapping or self-drilling screws include threading that terminates at a point, where the threaded point is configured to dig into a nearby material. The disclosure describes self-tapping screws, it will be understood that self-tapping screws as used herein are intended to include self-drilling screws and any other similar fasteners. Self-tapping screw 26 is illustrated extending through a hole 51 in raised boss portion 27 of base clamping feature 24. In one embodiment, the side vertical walls of raised boss portion 27 can be sized to permit a central shaft of screw 26 to extend between the side vertical walls, with the threads 53 of the fastener digging into and securing to the material 52 of the side vertical walls.

Figure 8:
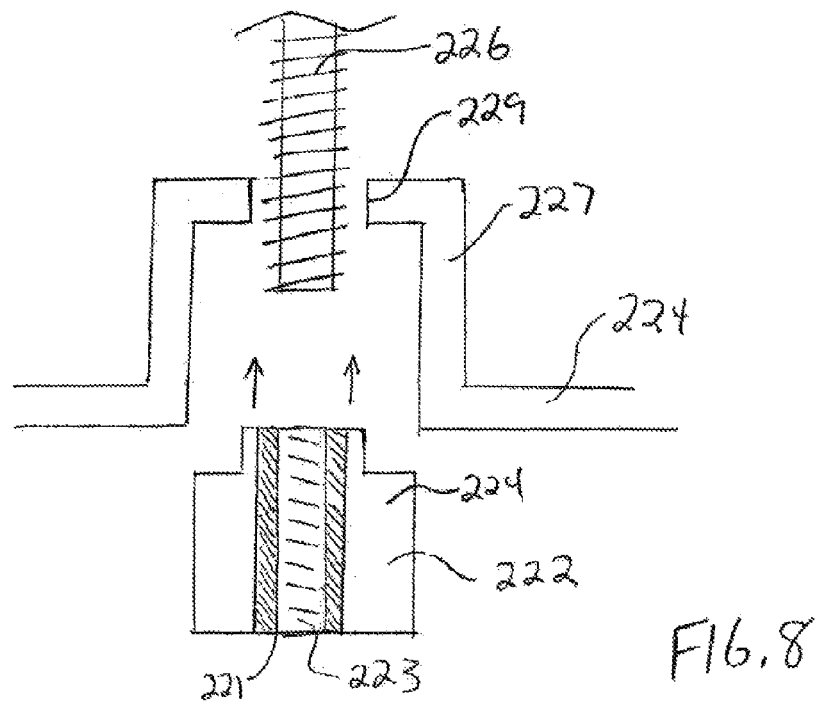
FIG. 8 illustrates in cross-section an exemplary machine screw being used to fasten to a base clamping feature, wherein an attachable screw boss feature is configured to attach to the base clamping feature and provide female threads to which the machine screw can fasten, in accordance with the present disclosure.

FIG. 8 illustrates in cross-section an exemplary machine screw being used to fasten to a base clamping feature, wherein an attachable screw boss feature is configured to attach to the base clamping feature and provide female threads to which the machine screw can fasten. Raised boss portion 227 is illustrated including a hole 229. A secondary attachable screw boss feature 222 is illustrated configured to be pressed against and secure to an underside of raised boss feature 227. Attachable screw boss feature 222 includes internal threading 223 configured to receive threading of exemplary machine screw 226. In one exemplary construction, attachable screw boss feature 222 can include a plastic body 224, with a metallic threaded insert 221 being molded or inserted within the plastic body 224.

Figure 9:
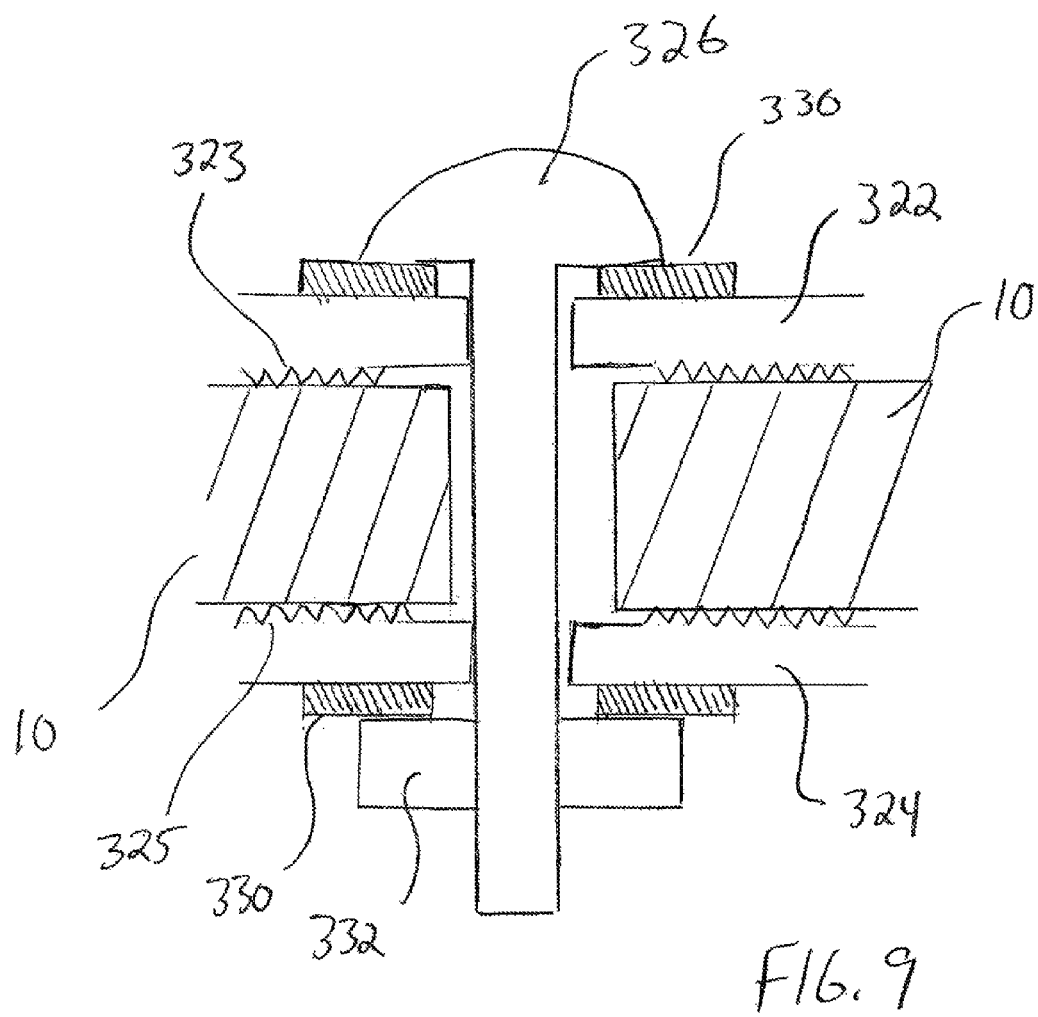
FIG. 9 illustrates in cross-section an exemplary bolt and nut combination being used to fasten an upper clamping feature to a base clamping feature, in accordance with the present disclosure.

FIG. 9 illustrates in cross-section an exemplary bolt and nut combination being used to fasten an upper clamping feature to a base clamping feature. In an alternative embodiment, a bolt 326 and a nut 332 can be used to provide secure clamping force for a glazing panel bracket. A top clamping feature 322 and a base clamping feature 324 are illustrated, each including gripping features 323 and 325, respectively, configured to securely grip glazing panels 10. Washers 330 are provided configured to widen a surface area over which the clamping force applied by bolt 326 and nut 332 is applied. According to one embodiment, a nut and bolt configuration as illustrated in FIG. 9 can be used close to ends of a glazing panel bracket to ease the assembly of the nut to the bolt during assembly of the roofing system.

Figure 10:
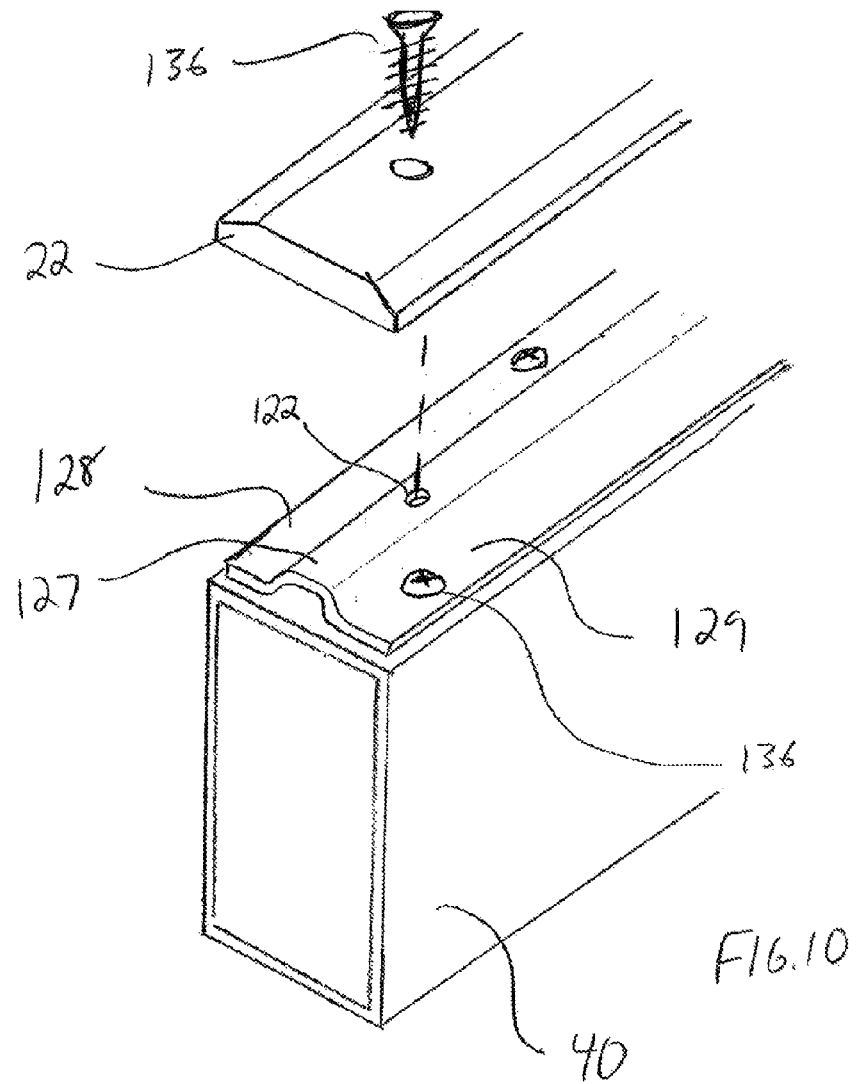
FIG. 10 illustrates an exemplary base clamping feature configured to be used without a base channel support, in accordance with the present disclosure.

FIG. 10 illustrates an exemplary base clamping feature configured to be used without a base channel support. Base clamping feature 128 is illustrated fastened directly to spacer unit 40. No base channel support is needed for use with base clamping feature 128. Counter sunk screws 136 are illustrated fastening feature 128 to spacer unit 40, where a top of screws 136 can be flush with a surface of feature 128, enabling a flat surface 129 to be presented to abut a glazing panel. Raised boss portion 127 is illustrated including hole 122 configured to receive screw 136 to be fastened through top clamping feature 22.

Figure 11:
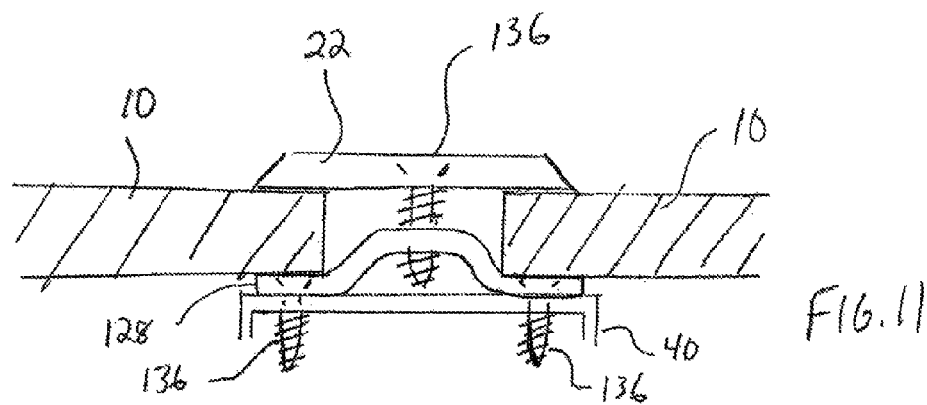
FIG. 11 illustrates in cross-section a panel roofing system including the base clamping feature of FIG. 10, in accordance with the present disclosure.

FIG. 11 illustrates in cross-section a panel roofing system including the base clamping feature of FIG. 10. Top clamping feature 22 and base clamping feature 128 are illustrated, securely clamping in place glazing panels 10. Screws 136 are illustrated fastening base clamping feature 128 to spacer unit 40 and providing clamping force, securing top clamping feature 22 to base clamping feature 128.

Clamping features of the glazing panel bracket include gripping feature surfaces configured to abut a flat rectangular face surface of the attached glazing panel. Gripping feature surfaces can include a flat surface, grooved surfaces, padded surfaces, textured surfaces, or any other features configured to apply a gripping clamping force to the abutting glazing panel.

It will be noted that the disclosed system, providing brackets to firmly secure a glazing panel on two sides for a roofing system can be used in other orientations. For example, the same or similar brackets can be used to hold glazing panels in a vertical orientation. Such a vertical panel or panels can be used, for example, to create a wind wall that can stand alone or be provided in conjunction with the disclosed roofing system.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A glazing panel roofing system, comprising:
    at least one glazing panel comprising:
        two flat rectangular face surfaces;
        two thin, long side surfaces; and
        two thin, short side surfaces; and
    glazing panel brackets each configured to clamp upon one of the long side surfaces of the glazing panel, each glazing panel bracket comprising:
        a base clamping feature comprising a base gripping feature surface configured to abut a first surface of the flat rectangular face surfaces;
        a top clamping feature comprising a top gripping feature surface configured to abut a second surface of the flat rectangular face surfaces;
        a threaded fastener securing the top clamping feature to the base clamping feature and maintaining a fixed distance between the top clamping feature and the base clamping feature, wherein torque applied to the threaded fastener changes a clamping force applied between the top clamping feature and the base clamping feature upon the glazing panel; and
        a one-piece, metallic base channel support comprising:
            an internal channel within the base channel support configured to slidingly receive the base clamping feature; and
            channel retaining features formed unitarily with the base channel support and wrapped around base clamping feature retaining the base clamping feature within the internal channel.

2. The glazing panel roofing system of claim 1, wherein the glazing panel is unbracketed along the two thin, short side surfaces.

3. The glazing panel roofing system of claim 1, wherein the glazing panel is unbracketed along a lower of the two thin, short side surfaces.

4. The glazing panel roofing system of claim 1, wherein each of the glazing panel brackets further comprise a plurality of base clamping features slid within the internal channel.

5. The glazing panel roofing system of claim 1, wherein one of the top gripping feature surface and the base gripping feature surface is flat.

6. The glazing panel roofing system of claim 1, wherein one of the top gripping feature surface and the base gripping feature surface comprises grooves configured to grip the glazing panel.

7. The glazing panel roofing system of claim 1, wherein one of the top gripping feature surface and the base gripping feature surface comprise a padded gripping feature.

8. The glazing panel roofing system of claim 1, wherein the base clamping feature comprises a raised boss section configured to receive the threaded fastener.

9. The glazing panel roofing system of claim 8, wherein the raised boss section comprises a plurality faces oriented at right angles.

10. The glazing panel roofing system of claim 8, wherein the raised boss section comprises parallel vertical walls spaced to engage with threading of the threaded fastener.

11. The glazing panel roofing system of claim 1, wherein the threaded fastener comprises a self-tapping screw.

12. The glazing panel roofing system of claim 1, further comprising a spacer unit situated between the base clamping feature and a roof support structure.

13. The glazing panel roofing system of claim 12, wherein the spacer unit is a section of rectangular tubing.

14. The glazing panel roofing system of claim 1, wherein each bracket is configured to clamp two glazing panels, one panel on each side of the bracket.

15. A glazing panel roofing system, comprising:
at least one glazing panel comprising:
  two flat rectangular face surfaces;
  two thin, long side surfaces; and
  two thin, short side surfaces;
spacer units comprising rectangular tubing attached to a roof support structure; and
glazing panel brackets each attached to one of the spacer units and configured to clamp upon one of the long side surfaces of the glazing panel, each glazing panel bracket comprising:
  a base clamping feature comprising a base gripping feature surface configured to abut a first surface of the flat rectangular face surfaces;
  a top clamping feature comprising a top gripping feature surface configured to abut a second surface of the flat rectangular face surfaces;
  a threaded fastener securing the top clamping feature to the base clamping feature and maintaining a fixed distance between the top clamping feature and the base clamping feature, wherein torque applied to the threaded fastener changes a clamping force applied between the top clamping feature and the base clamping feature upon the glazing panel; and
a one-piece, metallic base channel support comprising:
  an internal channel within the base channel support configured to slidingly receive the base clamping feature; and
  channel retaining features formed unitarily with the base channel support and wrapped around base clamping feature retaining the base clamping feature within the internal channel.

* * * * *